United States Patent [19]

Alcaraz et al.

[11] Patent Number: 5,897,849
[45] Date of Patent: Apr. 27, 1999

[54] UNIMODAL, LARGE-PORE SILICAS BY HYDROTHERMAL TREATMENT OF SILICIA POWDERS

[75] Inventors: Joseph Alcaraz, Chicago; Jennifer S. Holmgren, Bloomingdale, both of Ill.

[73] Assignee: UOP LLC, Des Plaines, Ill.

[21] Appl. No.: 08/988,766

[22] Filed: Dec. 11, 1997

Related U.S. Application Data

[63] Continuation-in-part of application No. 08/774,751, Dec. 30, 1996, abandoned.
[51] Int. Cl.$^6$ ..................................................... C04B 35/14
[52] U.S. Cl. .............................. 501/12; 501/80; 501/133; 423/335
[58] Field of Search ..................................... 423/335, 339, 423/338; 501/80, 12, 133

[56] References Cited

U.S. PATENT DOCUMENTS

| | | | |
|---|---|---|---|
| 4,617,060 | 10/1986 | Dreibelbis | 524/557 |
| 4,783,435 | 11/1988 | Dreibelbis | 502/214 |
| 4,937,394 | 6/1990 | Dreibelbis | 568/896 |
| 5,200,165 | 4/1993 | Harper et al. | 423/339 |
| 5,202,104 | 4/1993 | Watanabe et al. | 423/335 |
| 5,637,636 | 6/1997 | Cartwright et al. | 524/493 |

*Primary Examiner*—Paul Marcantoni
*Attorney, Agent, or Firm*—Thomas K. McBride; Frank S. Molinaro

[57] ABSTRACT

The need for silicas with large pore sizes can be met by hydrothermal treatment of a silica powder with a mineralizing agent. Pore sizes in the range 300–25,000 angstroms, and more particularly in the range up to 10,000 angstroms, are readily obtained using mineralizing agents such as hydroxide, carbonate, and fluoride at temperatures in the range 85–300° C. A narrow, unimodal distribution of pores is typical.

4 Claims, No Drawings

UNIMODAL, LARGE-PORE SILICAS BY HYDROTHERMAL TREATMENT OF SILICIA POWDERS

CROSS REFERENCE TO RELATED APPLICATION

This application is a continuation-in-part of my copending application, Ser. No. 08/774,751, filed Dec. 30, 1996, abandoned all of which is incorporated herein by reference.

FIELD OF THE INVENTION

This invention pertains to large-pore silicas. More particularly, this invention relates to silicas having a pore size in the 300–10,000 angstrom range, and with even greater particularity, our invention relates to large-pore silicas having pores of the aforementioned size range with the pore size having a unimodal distribution. The subject matter of this application also includes the hydrothermal treatment of silicas so as to produce large-pore silicas having a unimodal size distribution.

BACKGROUND OF THE INVENTION

Silica long has been used, either per se or coated with an organic material, as a stationary phase in chromatography, and as such has enjoyed broad success and applicability. As new chromatographic needs arose, these often were met by changing the properties of silica, so that several discrete kinds of silica have been used as a stationary phase. For example, Okamoto and his group recently have described chiral stationary phases, i.e., stationary phases coated with a chiral organic material and used in the chromatographic separation of racemic mixtures to afford chiral components, and has found that such separations are effected particularity well using a large-pore silica as a support, i.e., silica having pores on the order of 300–1,000 angstroms. See, for example, Y. Okamoto and Y. Kaida, *J. Chromatography A*, 666 (1994) 403–419.

Silicas containing large pores are available, but routes to their preparation result in high cost, low reproducibility, and limited availability. For example, a pore-filling/melt procedure has been successfully used to prepare large-pore silica with pore sizes 1,000 angstroms and greater. In this procedure silica is impregnated with a salt, such as sodium chloride, by an incipient wetting technique, so the pores are filled with a solution of sodium chloride. The wetted materials are carefully dried, then heated to a temperature where sodium chloride liquefies and the pore structure of silica is disrupted. Upon cooling, the silica recrystallizes around the salt, generating pores within the bulk silica of large size ($\geq$1,000 angstrom pores). Subsequently the salt is washed out to leave silica having the aforementioned large-pore structure.

It has been observed that the silicas prepared by the foregoing method have a bimodal pore distribution. Secondly, we have observed that the resulting silicas have little, if any, silanol functionality, which may be important where silica is used as a support for an organic coating. This observation is reasonable given the high calcination temperatures used. Last, the method is somewhat inconvenient to apply in making commercial sized batches.

What we required was a silica having large pores (at least 300 angstroms) with a narrow pore size distribution, a relatively low surface area (20–30 square meters per gram ($m^2/g$)) and particles at least within the 50–150 micron range. It was required of any method of making such materials that the method be readily adaptable to commercial-size runs, that it afford control over pore size so as to give a reproducible pore size and distribution, that it was applicable to silicas generally, and that it was relatively inexpensive and did not require specialized equipment or a severe heat treatment.

What we have found is that when a silica powder is contacted with a mineralizing agent in the temperature range of 85–300° C. for a time as short as four hours and up to several days, one introduces into the silica large pores with a unimodal size distribution. This offers a general route to large pore silicas whose pore size can be readily controlled, which can be practiced effectively without specialized equipment, which avoids the high temperatures of prior art methods, and which is readily practiced on a large, commercial scale.

Araya et al., U.S. Pat. No. 5,354,548, prepared a porous silica by forming an oil-in-water emulsion whose oil phase was greater than 50 volume percent from an aqueous solution of a silica precursor and a suitable water-immiscible liquid, and then gelling the continuous aqueous phase of the emulsion. Kislev et al., U.S. Pat. No. 3,888,972, subjected a silica xerogel to hydrothermal treatment at 100–380° C. and 1–100 atmospheres followed by drying at 100–300° C. to obtain silicas with an average pore diameter in the 230–30,000 angstrom range. Xerogels are dried gels with high surface areas (typically 500–900 $m^2$/g) with small pore sizes typically in the 10–100 angstrom range. The patentee of U.S. Pat. No. 3,975,293 treated silica gel in an ammoniacal medium under pressure to obtain pores up to about 2000 angstroms. In U.S. Pat. No. 3,869,409 the patentees teach preparation of large pore silicas by preparing an aqueous suspension of silica containing an alkali, alkali or alkaline earth metal salt, or carbon black, then drying the suspension (i.e., evaporating all the water) to form a xerogel with enlarged pores. Acker, U.S. Pat. No. 3,526,603, made intermediate density gels by washing an acid-set silica hydrogel with a hot ammonia solution, neutralizing the base washed hydrogel, washing, and then drying the hydrogel. Finally, U.S. Pat. No. 4,474,824 teaches methods of preparing and treating hydrous silica gels to increase their abrasiveness by contacting the gels with an alkaline medium or with an aqueous acidic solution at temperatures of 80–100° F.(27–38° C.).

A distinguishing feature of our invention which separates it from the foregoing art is our use of a silica powder in the preparation of large pore silicas. In this application "silica powder" means a collection of discrete, solid silica particles with a size (i.e., diameter or long dimension) in the range of 25 microns to about 5 mm. Our use of a silica powder is a glaring departure from the teachings of the prior art, and makes our method of preparing large pore silicas far more general, more convenient, and more susceptible to commercial-scale manufacture than previous approaches. The process which is our invention does not proceed via a hydrogel and does not occur via gelatinization, which is a critical distinction over the prior art. Instead the treated silica powders may be directly separated, washed, dried, and used per se.

SUMMARY OF THE INVENTION

The purpose of this invention is the preparation of large pore silicas having a unimodal pore size distribution and a low surface area. An embodiment comprises contacting a silica powder with a mineralizing agent at a temperature between about 85–300° C. for a time between about 4 hours up to several days to afford amorphous silicas having pores 300–25,000 angstroms in size and with a surface area no greater than about 30 m²/g. In a more specific embodiment, the mineralizing agent is hydroxide.

DESCRIPTION OF THE INVENTION

Although there are prior art methods available to afford large-pore silicas, the pore size distribution in such materials is bimodal. An important characteristic is that none of the prior art methods employ silica powder as the silica source. We have observed that when a silica is contacted with a mineralizing agent in the temperature range of 85–300° C. for times varying between 4 hours and perhaps as long as 10 days, the resulting silica has pores in the 300–25,000 angstrom range with low surface area and with the silica in an amorphous state. The advantages of our method is the use of relatively low temperatures throughout, the use of silica powders as our starting point, and its facile applicability to the preparation of commercial quantities of the resulting macroporous silica. Our invention is simple, is very effective, and affords a relatively high degree of control over the size of pores introduced.

Although the successful and effective practice of our invention is independent of any theory, we have developed an hypothesis which provides a convenient model within which our method is reasonably understood. We believe that the "mineralizing agents" act to disrupt the long-range order in silica. This is tantamount to dissolving some small fraction of silica so as to disrupt the bulk structure. Since there is only partial dissolution of silica, there also is continual reorganization and reconstruction of the silica framework. The extent to which one can dissolve and reconstruct silica is related to the rate of its dissolution and the rate of its reorganization. Consequently, both the amount of mineralizer and the history of the silica (e.g., its prior calcination temperature) are important in influencing the size of the pores introduced. Both can be viewed as means of controlling pore size; in general, the less severe the mineralization conditions, the smaller will be the pores introduced. It also follows from the foregoing model that as the temperature increases (increased severity of mineralization) the pore size will increase. We wish to emphasize that our method affords control over the size of the pores formed, with a homogenous distribution of pores, without controlling the number of pores formed.

Our invention is essentially a hydrothermal treatment of silica powder with a mineralizing agent. In summary, hydrothermal treatments are conveniently done at autogenous conditions. An aqueous slurry of the silica powder and an aqueous solution of a mineralizing agent is heated at 85–300° C. for a time as short as about 4 hours up to perhaps as long as 10 days. The silica powder then is collected from the cooled aqueous mixture and washed to afford the amorphous, large-pore silicas of our invention.

The nature of the silica powder which is mineralized is not critical, but does affect the specific outcome. For example, silica which has been calcined at a high temperature is more resistant to mineralization than a silica calcined at a lower temperature, and consequently high temperature calcined silica upon hydrothermal treatment will give smaller pore sizes, although still in the 300–25,000 angstrom range. Therefore, the specific pore size introduced in a given treatment depends on the nature of the silica treated, but the fact of large pore introduction does not depend on the nature of the silica. Generally, the silica powder is used as a 20–60 wt. % aqueous slurry, but this is solely a matter of convenience. The amount of silica powder present in the slurry is not a critical aspect of our invention, nor does it affect the practice or outcome of our invention in any significant fashion.

As mentioned above, the mineralizers of our invention perform the function of partially dissolving silica and thus disrupting the long-range order. It is the continuing process of partial dissolution followed by reorganization and reconstruction which leads to the introduction of large sized pores into silica. Consequently, any agent which successfully partially dissolves silica is a mineralizing agent in the context of our invention. Examples of mineralizing agents include inorganic anions of which hydroxide, carbonate, and fluoride are illustrative examples, as well as organic complexing agents such as diphenols (e.g., catechol) and amines (e.g., ethylenediamine, 2,2'-bipyridine), xanthates, ketones (e.g., acetylacetonate), and complexing agents having more than one functional group (e.g., ethylenediamine tetraacetic acid, nitrilotriacetic acid). Where the mineralizing agent is one of the foregoing anions, the nature of the salt which is the anion source is not important, so long as the salt is sufficiently water soluble to be conveniently used. Examples of suitable cations in salts are the alkali metal cations, especially sodium and potassium, ammonium and quaternary ammonium cations, and some alkaline earth cations, especially magnesium. But it needs to be emphasized that the nature of the cation is not important so long as the resulting salt has adequate water solubility. In short, the cation is not functional in our invention. The foregoing examples are merely illustrative rather than exhaustive; in general, suitable mineralizing agents will be well known to those practicing in the silica arts.

The mineralizing agents of our invention may be used in concentrations between about 0.2 up to about 11 weight percent. The particular concentration used will depend upon the nature of the mineralizer, the silica source, and pore size desired. In general, the stronger the mineralizing agent—i.e., the greater its capacity to partially dissolve silica—the lower its concentration for a given pore size-silica combination. Increasing pore size generally requires increasing concentration. Similarly, the more resistant the silica source to dissolution the greater the concentration of mineralizing agent. The foregoing are merely the logical consequences of silica dissolution by the mineralizing agents of our invention. The pH at which the mineralizing agents are contacted with silica will in large part depend upon the mineralizing agent itself. For example, where hydroxide and carbonate are the mineralizing agent, the pH is necessarily rather basic, i.e., 9 or above. On the other hand, where fluoride is the mineralizing agent, it has been found convenient to perform mineralization at a pH in the range of 5.5 up to as high as about 6.5. In general, the pH inherent to that mineralizing agent is the pH of the aqueous solution used.

The silica powder is treated with the mineralizing agent at a temperature generally in the range of 85–300° C. at autogenous pressure. Higher temperatures may be used in the practice of our invention but these are generally not advantageous. The range between about 100 and about 200° C. is a preferred temperature range. The treating time may be as short as about 4 hours and may be as long as about 10 days. As previously mentioned, treating at higher temperatures and for longer times affords a silica with larger pores.

The silicas which are formed according to the practice of our invention are amorphous and often have a remarkably narrow unimodal pore size distribution. Specifically, the pore distribution generally is such that 50% of the pores are within 10% of the median pore size, and often within 50 angstroms of the median pore size. Thus, a silica characterized as having a median pore size of 1000 angstroms will have 50% of its pores within the range 900–1100 angstroms, and often within the range 950–1050 angstroms. The silicas also have a surface area not more than about 30 $m^2/g$ with large pores in the size range of 300 up to about 25,000 angstroms; although silicas with pores in the range up to about 10,000 angstroms are favored, silicas with a median pore size up to about 4,000 angstroms are most common, and silicas with a median pore size of about 1000 angstroms seem most desirable. Quite importantly, the size of the large pores introduced is controllable, as described above, which is a unique advantage of our method.

Quite significantly, the silicas of our invention show only Q3 silanols as determined by nuclear magnetic resonance spectroscopy. That is, nuclear magnetic resonance spectroscopy can distinguish between the OH groups of different types of silanols; see "Solid State NMR for Chemists," Colin A. Fyfe, CFC Press, 1983, pp 337–61. "Q3 silanols" refers to the structure $Si(OSi)_3(OH)$, whereas "Q2 silanols" refer to the OH in structures as $Si(OSi)_2(OH)_2$. That our silicas contain at least about 10%, and usually at least 13% Q3 silanols, and under about 0.5% Q2 silanols is a dear differentiation from prior art silicas. This is significant, since the large-pore silica as prepared by the prior art pore-filled/melt method have no Q3 (or Q2) silanols, which is understandable given the high calcination temperatures endured by the materials. Thus, this is a dear differentiation between the silicas resulting from our method and that of the prior art large-pore silicas. The presence of Q3 silanols also is important since it is believed that a silanol OH group is important in subsequent binding of an organic coating to the silica when used as a support. Thus, not only is our material clearly differentiated from that of the prior art, but our material also is advantageous when used as support for organic coatings, which is in fact a major use contemplated for the large-pore silicas of our invention.

EXAMPLES

General Method of Preparations All hydrothermal treatments were done at autogenous conditions. An aqueous slurry consisting of the silica powder (25–54% solids) and a solution containing a mineralizer were placed in a sealed 125 cc Parr reactor, which subsequently was placed in a forced air oven at 100–200° C. for 4 hours up through several days under static conditions. The silica powder was recovered and washed by certrifugation or filtration.

For comparison, large-pore silica was prepared by the pore-filled/melt method (NaCl, 800° C.) following the procedure of 1. Novak and D. Berek, *J. Chromatography A*, 665 (1994) 33–6.

The experimental variables in the preparation of the large-pore silicas of our invention are summarized in Table 1. Some important physical properties of these materials are summarized in Table 2.

TABLE 1

Sample Preparation of Hydrothermally Treated Silicas

| Sample | Wt %[a] (slurry) | Mineralizing Agent & Conc. | T (°C.) | t (days) |
|---|---|---|---|---|
| A | 54 | NaOH, Si/OH=95 | 124 | 1 |
| B | 25 | NaOH, Si/OH=95 | 151 | 1 |
| C | 54 | NaOH, Si/OH=95 | 151 | 1 |
| D | 54 | NaOH, Si/OH=95 | 200 | 1 |
| E | 54 | NaOH, Si/OH=11 | 152 | 1 |
| F | 54 | NaF, Si/F=44 | 151 | 1 |
| G | 54 | NaCl, Si/Cl=2 | 200 | 1 |
| H | 54 | $Na_2CO_3$, $Si/CO_3$=11 | 152 | 1 |

[a] Weight percent solids relative to water.

TABLE 2

Sample Properties of Silicas

| Sample | Surface Area[a] | Pore Vol.[b] | Pore size[c] | % Q3 silanols |
|---|---|---|---|---|
| Reference 1[d] | 350 | 0.99 | 114 | 28 |
| Reference 2[e] | 17 | 1.3 | 2940 | 0 |
| A | 98 | 0.54 | 230 | |
| B | 51 | 0.74 | 350 | |
| C | 50 | 0.67 | 610 | |
| D | 9 | 0.59 | 3500 | 18 |
| E | 71 | 0.73 | 400 | |
| F | 43 | 0.75 | 1010 | |
| G | 39 | 0.70 | 1010 | |
| H | 29 | 0.70 | 1210 | 17 |

[a] Surface area in square meters per gram by BET measurements.
[b] Pore volume in cc per gram, determined by mercury intrusion.
[c] Pore size (diameter, in angstroms) by mercury intrusion for pores of diameter >300 angstroms, by nitrogen absorption for pore diameters <300 angstroms.
[d] Silica powder (Zorbax LP) was obtained from BTR Separations and used for hydrothermally treated silicas.
[e] Prepared by pore-filled/melt procedure of Novak and Berek, op. cit., at 800° C.

What is claimed is:

1. An amorphous silica of surface area less than about 30 square meters per gram ($m^2/g$) and having a unimodal pore size distribution with pores in the size range 300 to about 25,000 angstroms, at least about 10% of Q3 silanols as measured by nuclear magnetic resonance spectroscopy, and less than about 0.5% of Q2 silanols as measured by nuclear magnetic resonance spectroscopy.

2. The silica of claim 1 where the median pore size is at least 1000 Å.

3. The silica of claim 1 having at least about 13% of Q3 silanols as measured by nuclear magnetic resonance spectroscopy.

4. The silica of claim 1 where the pore size is in the range 800–10,000 angstroms.

* * * * *

UNITED STATES PATENT AND TRADEMARK OFFICE
CERTIFICATE OF CORRECTION

PATENT NO: 5,897,849
DATED: Apr. 27, 1999
INVENTORS: Alcaraz et al.

It is certified that error appears in the above-identified patent and that said Letters Patent is hereby corrected as shown below:

On the title page, item [54] and column 1, line 2:

The title SILICIA should be corrected to -- SILICA.

Signed and Sealed this

Seventh Day of September, 1999

Attest:

Q. TODD DICKINSON

Attesting Officer

Acting Commissioner of Patents and Trademarks